(12) United States Patent
Hill

(10) Patent No.: US 9,157,810 B2
(45) Date of Patent: Oct. 13, 2015

(54) APPARATUS AND METHOD FOR SPATIALLY RESOLVED TEMPERATURE MEASUREMENT

(75) Inventor: Wieland Hill, Odenthal (DE)

(73) Assignee: LIOS TECHNOLOGY GMBH, Cologne (DE)

( * ) Notice: Subject to any disclaimer, the term of this patent is extended or adjusted under 35 U.S.C. 154(b) by 717 days.

(21) Appl. No.: 13/499,514

(22) PCT Filed: Sep. 27, 2010

(86) PCT No.: PCT/EP2010/064268
§ 371 (c)(1),
(2), (4) Date: Mar. 30, 2012

(87) PCT Pub. No.: WO2011/039142
PCT Pub. Date: Apr. 7, 2011

(65) Prior Publication Data
US 2012/0183015 A1    Jul. 19, 2012

(30) Foreign Application Priority Data

Oct. 1, 2009   (DE) .......................... 10 2009 047 990

(51) Int. Cl.
*G01K 11/32*   (2006.01)
*G01K 11/12*   (2006.01)

(52) U.S. Cl.
CPC ....................... *G01K 11/32* (2013.01)

(58) Field of Classification Search
CPC ............................. G01K 11/32; G01K 11/12
USPC ......... 374/130–132, 161, 137, 141, 120, 121; 385/12; 356/43
See application file for complete search history.

(56) References Cited

U.S. PATENT DOCUMENTS 4,868,381 A * 9/1989 Davis ....................... 250/227.27
5,696,579 A * 12/1997 Johnson ...................... 356/35.5
(Continued)

FOREIGN PATENT DOCUMENTS

DE    3341048 A * 5/1984
DE    689 12 603 T2  5/1994
(Continued)

OTHER PUBLICATIONS

Soto M A et al: "Performance improvement in Brillouin-based simultaneous strain and temperature sensors employing pulse coding in coherent detection schemes", Optical Fiber Communication—Incudes Post Deadline Papers, 2009. OFC 2009. Conference on, IEEE, Piscataway, NJ, USA, Mar. 22, 2009, pp. 1-3, XP031467875, ISBN: 978-1-4244-2606-5 paragraph [0002]; figure la.
(Continued)

*Primary Examiner* — Gail Kaplan Verbitsky
(74) *Attorney, Agent, or Firm* — Cohen & Hildebrand, PLLC

(57) ABSTRACT

Apparatus for spatially resolved temperature measurement, comprising at least one optical fiber (4) for spatially resolved temperature measurement, at least one laser light source (1), the light (11) from which can be coupled into the optical fiber (4), wherein those components (12, 12a, 12b) of the light (11) produced by the laser light source (1) which are scattered back in the optical fiber (4) can be coupled out of the optical fiber (4) and detected, modulator means (2) permitting the modulation of the light (11) that is to be coupled into the optical fiber (4), and also demodulator means (5, 6) which permit a demodulation of those components (12, 12a, 12b) of the light (11) which are coupled out of the optical fiber (4), wherein the demodulator means (5, 6) are designed as optical demodulator means (5, 6) and/or wherein the modulator means (2) are designed as optical modulator means (2).

11 Claims, 3 Drawing Sheets

(56) References Cited

U.S. PATENT DOCUMENTS

| | | | |
|---|---|---|---|
| 6,078,397 A * | 6/2000 | Monchalin et al. | 356/503 |
| 6,208,415 B1 * | 3/2001 | De Boer et al. | 356/450 |
| 6,271,942 B1 * | 8/2001 | Sasai et al. | 398/9 |
| 6,285,806 B1 | 9/2001 | Kersey et al. | |
| 6,490,538 B1 | 12/2002 | Glombitzs et al. | |
| 2001/0036219 A1 * | 11/2001 | Camm et al. | 374/112 |
| 2010/0047058 A1 * | 2/2010 | Mitra et al. | 415/118 |
| 2011/0058590 A1 * | 3/2011 | Hill | 374/161 |

FOREIGN PATENT DOCUMENTS

| | | |
|---|---|---|
| DE | 697 31 108 T2 | 9/2005 |
| EP | 0 692 705 A1 | 1/1996 |
| EP | 0 898 151 A2 | 2/1999 |
| GB | 2 243 210 A | 10/1991 |
| GB | 2 389 902 A | 12/2003 |
| JP | 06300572 A * | 10/1994 |
| WO | WO 84/04 385 A1 | 11/1984 |

OTHER PUBLICATIONS

Wosniok A et al: "Distributed Fibre Optic Sensor System for Temperature and Strain Monitoring Based on Brillouin Optical-Fibre Frequency-Domain Analysis", Procedia Chemistry, Elsevier, vol. 1, No. 1, Sep. 1, 2009, pp. 397-400, XP026799566, ISSN: 1876-6196 [retrieved on Sep. 1, 2009] the whole document.
German International Search Report of DE 10 2009 047 990.2 dated Apr. 7, 2011.
International Search Report for Application PCT/EP2010/064268 mailed Jan. 25, 2011.

* cited by examiner

APPARATUS AND METHOD FOR SPATIALLY RESOLVED TEMPERATURE MEASUREMENT

This is an application filed under 35 USC §371 of PCT/EP2010/064268, claiming priority to DE 10 2009 047 990.2 filed on Oct. 1, 2009.

BACKGROUND OF THE INVENTION

The present invention relates to an apparatus for spatially resolved temperature measurement and to a method for spatially resolved temperature measurement.

Fiber-optic temperature measurement systems (Distributed Temperature Sensing—DTS) can use optical effects in optical fibers for spatially resolved temperature measurement. By way of example, the effect of Raman scattering can be used. This involves the radiation from a narrowband source of electromagnetic radiation (e.g. by way of a laser) being inelastically scattered in the fiber material. The ratio of the intensities of the scattered radiation with a shorter wavelength than the excitation (anti-Stokes scattered radiation) and the scattered radiation at a longer wavelength (Stokes scattered radiation) is temperature dependent and can be used for temperature determination. By using frequency (Optical Frequency-Domain Reflectometry—OFDR (EP0692705, EP0898151)) or pulse techniques (Optical Time-Domain Reflectometry—OTDR), the temperature along the fiber can be determined with spatial resolution. By way of example, such measuring systems can be used for monitoring fires in tunnels and channels, for monitoring power cables and pipelines and for mining oil and gas.

An apparatus and a method of the type cited at the outset are known from EP 0 692 705 A1, for example. In this case, a problem of the spatially resolved temperature measurement in optical fibers is the limited spatial resolution along the fiber.

In the case of pulse techniques, this is determined by the width of the laser pulses and the time resolution of the detection electronics. In the case of frequency techniques, the spatial resolution is limited by the maximum frequency. Known OTDR-DTS setups achieve spatial resolutions in the region of 1 m.

In the OFDR-DTS arrangements known to date, the optical output power of a semiconductor laser is modulated by modulating the laser current. The detection is effected by demodulating or mixing the electrical signals coming from the optical receiver. This may involve the use of homodyne detection (demodulation using the laser frequency) or else heterodyne detection (mixing with a frequency which is shifted in comparison with the laser). Heterodyne detection has the advantage that the downstream amplifiers can be operated in narrowband fashion on a fixed frequency.

Both the electrical laser modulation and the electrical demodulation are limited in terms of frequency.

The laser needs to be modulated using comparatively large currents (approximately 1A). The inductances in the supply lines and also the design of the laser allow the necessary modulation depths to be achieved only up to frequencies in the order of magnitude of 100 MHz.

For detecting the modulated light, photodiodes with transimpedance amplifiers are usually used. With the requisite DC coupling and the necessary gains, it is possible to implement frequencies in the region of 250 MHz.

Electrical modulation of the laser and electrical demodulation of the received signals can be used to achieve spatial resolutions of approximately 0.5 m.

An alternative to distributed temperature measurement in normal optical fibers is the use of Fiber Bragg Gratings (FBGs). Such FBGs can be introduced into optical fibers at short intervals and thus allow temperature measurements at high spatial resolution. However, the technique is very complex (each grating needs to be coded individually) and also allows only isolated measurements.

Numerous industrial applications and applications in the environment require distributed temperature measurements at spatial resolutions of 0.1 m or better. These spatial resolutions cannot be achieved with the known arrangements.

BRIEF SUMMARY OF THE INVENTION

The problem on which the present invention is based is that of providing an apparatus and a method of the types cited at the outset which can be used to attain a high spatial resolution.

According to the invention, the demodulator means are in the form of optical demodulator means and/or the modulator means are in the form of optical modulator means. The subject matter of the invention is therefore the use of optical techniques for demodulation and/or modulation in a DTS appliance. Such techniques achieve frequencies in the GHz range and thus allow the desired spatial resolutions of 0.1 m or better.

By way of example, sensor means in the form of a photodiode can be irradiated not only with the optical signal from the optical fiber but also, simultaneously, with a second modulated light signal. Both signals can be mixed in the photodiode. Depending on whether the second optical signal is modulated with the same or a shifted frequency, a homodyne or heterodyne mixed signal is obtained.

As an alternative to mixing in the photodiode, the measurement signal from the optical fiber can also be modulated directly using a modulator, particularly a Mach-Zehnder modulator. In this case, homodyne and heterodyne variants are likewise conceivable.

At the transmission end too, it is possible to use optical techniques in order to allow the detection of relatively high frequencies.

When an optical modulator is used, the laser can be operated with direct current. The continuous laser radiation is modulated with the requisite frequencies using an optical modulator. Such a modulator may be a Mach-Zehnder modulator, for example. In this modulator, the laser light is split onto two interferometer arms, and the optical path length in an arm is modulated using electro-optical effects. When the two light components have been combined, a modulated laser light is obtained by means of interference. The advantage of this arrangement over direct modulation of the laser is that the electro-optical modulation uses very little electrical power, and therefore significantly higher frequencies can be implemented.

An OFDR-DTS appliance with high spatial resolution according to the invention may generally contain the following essential components:

lasers, coupling optics, filters, optical fibers, optical detector(s), as in the case of previously known setups, and also at least one optical demodulator and/or modulator.

According to the invention, the demodulation is effected using optical means and/or the modulation is effected using optical means. In this case, the method may be an OFDR or OTDR method, in particular.

An OFDR method according to the invention involves the use of continuous modulation of the light intensity. The signals are then analyzed in terms of amplitudes and phases for different modulation frequencies. Normally, the signal is mixed with a (further) frequency, and the resulting difference frequency is further amplified and evaluated.

In this case, it is possible for the OFDR method to involve the intensity of the light being modulated with fixed or discrete frequencies. By way of example, multiples of a fundamental frequency are used: $0*f, 1*f, 2*f, 3*f, \ldots, i*f, \ldots, m*f$. Preferably, $m=2**n$, that is to say 256, 512, 1024, 2048, ..., for example. At each frequency, the amplitude and phase of the signal coupled out from the optical fiber are registered. These "frequency data" are processed using inverse (fast) Fourier transformation and are therefore transferred to the time domain. These time data allow association of the distance. Typically, $f=1$ to 100 kHz and $m*f=1$ to 1000 MHz. To simplify the detection, the signal at $i*f$ is mixed with a second frequency $i*f-f_z$ in order to obtain a signal which is easier to filter and amplify at the intermediate frequency $f_z$ (heterodyne detection).

Alternatively, it is possible for the OFDR method to involve the intensity of the light being modulated with a frequency which varies over time. By way of example, the intensity of the light can be modulated with a linearly rising frequency. The signal coupled out from the optical fiber is mixed with the same frequency, for example. A spectra of difference frequencies is then obtained which is determined by the propagation time of the signals.

Both of the aforesaid approaches to frequency modulation of the intensity can involve the use of an optical demodulator and/or modulator, according to the invention.

The laser light source used according to the invention does not necessarily have to emit light in the visible spectral range but rather can also emit radiation of a longer wavelength in the near infrared range, in particular.

BRIEF DESCRIPTION OF THE DRAWINGS

Further features and advantages of the present invention become clear from the description below of preferred exemplary embodiments with reference to the appended figures, in which.

DETAILED DESCRIPTION OF THE INVENTION

In the figures, parts which are the same or which have the same function are provided with the same reference symbols.

Figure 1:
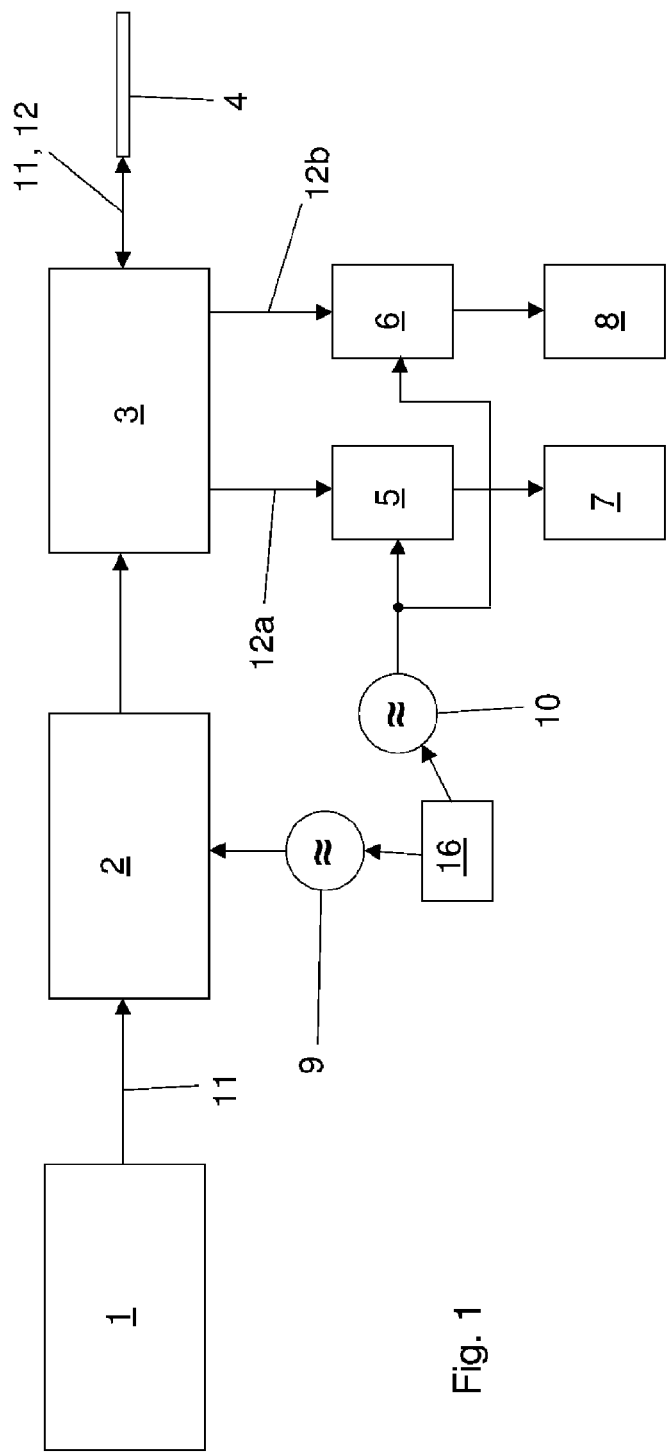
FIG. 1 shows a schematic illustration of a first embodiment of an apparatus according to the invention.

The first embodiment, depicted in FIG. 1, comprises a laser light source 1, optical modulator means 2, filter and spectral splitter means 3, an optical fiber 4, optical demodulator means 5, 6 and sensor means 7, 8.

Furthermore, actuating means 9, 10 for the modulator means 2 and the demodulator means 5, 6 are provided. Furthermore, the apparatus may comprise coupling means—not depicted—for coupling in and coupling out the light 11 produced by the laser light source into the optical fiber 4 and from the optical fiber 4. In addition, the apparatus may comprise evaluation means—not depicted—which can determine the temperature in the optical fiber 4 in spatially resolved fashion from the light components which are detected by the sensor means 7, 8, in a manner which is known per se.

The light 11 emerging from the laser light source 1 is modulated by the modulator means 2 with a frequency which is prescribed by the actuating means 9. To this end, the modulator means 2 may be in the form of a Mach-Zehnder modulator, for example. Such a Mach-Zehnder modulator has two interferometer arms onto which the light 11 can be split, wherein in one of the arms the light 11 can be modulated, in particular frequency modulated, by an electro-optical modulator.

The light 11 modulated in this manner can be coupled into the optical fiber 4 using the filter and spectral splitter means 3—shown only schematically—and coupling means—not shown—such as lenses. The optical fiber 4 is likewise shown only schematically and may have a length of several hundred meters or more.

The components 12 of the light 11 produced by the laser light source which are backscattered in the optical fiber 4 are filtered by the filter and spectral splitter means 3 after coupling out from the optical fiber 4. By way of example, the filter and spectral splitter means 3 output two components 12a, 12b of the light, which correspond to the Stokes and anti-Stokes scattered radiation.

Each of the components 12a, 12b passes through optical demodulator means 5, 6 and is modulated thereby with a frequency which is prescribed by the actuator means 10. To this end, the demodulator means 5, 6 may also be in the form of a Mach-Zehnder modulator, for example.

In this case, the frequencies prescribed by the actuator means 9, 10 may be the same or different than one another. The actuator means 9, 10 can be synchronized in a suitable manner, for example by a common clock generator or zimer 16.

The components 12a, 12b of the light which emerge from the demodulator means 5, 6 are detected by the sensor means 7, 8, which are in the form of photodiodes, for example. The evaluation means—not shown—can evaluate the detected signals such that the temperature in the optical fiber 4 is determined in spatially resolved fashion.

Figure 2:
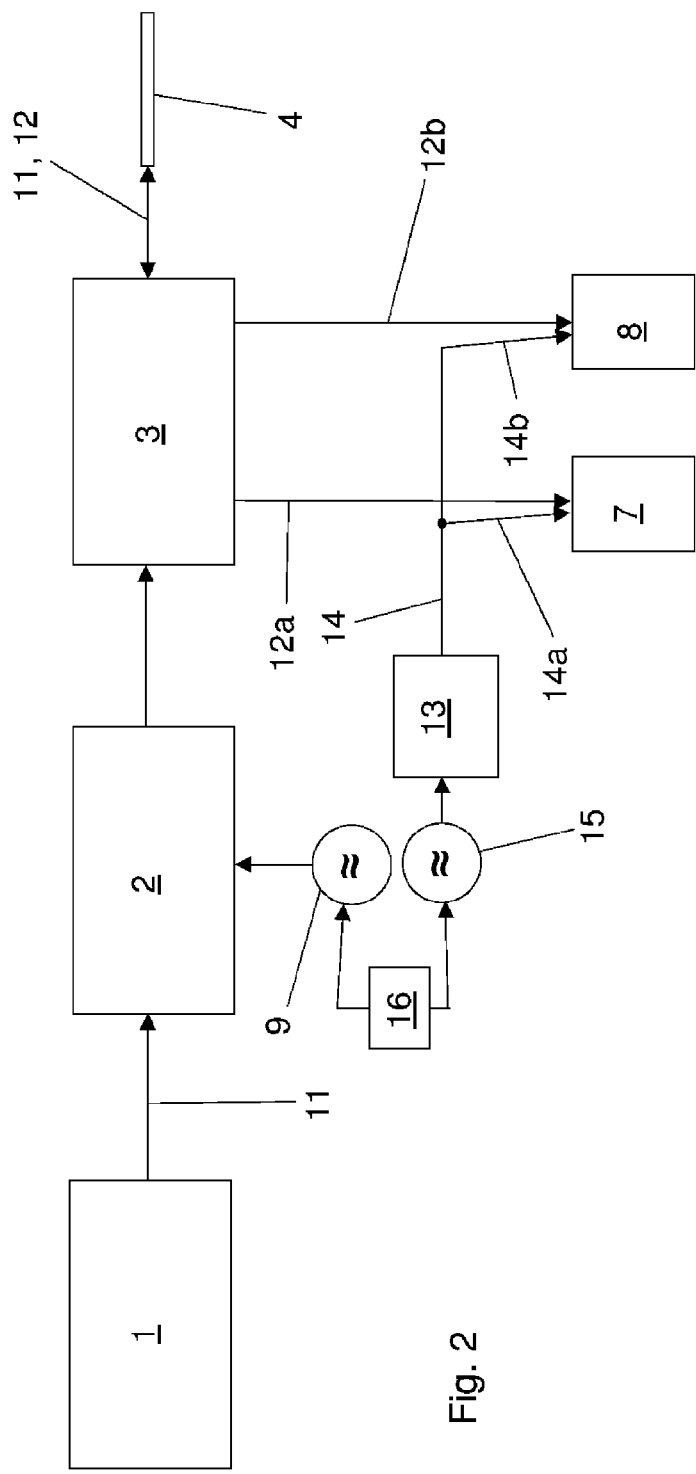
FIG. 2 shows a schematic illustration of a second embodiment of an apparatus according to the invention.
Figure 3:
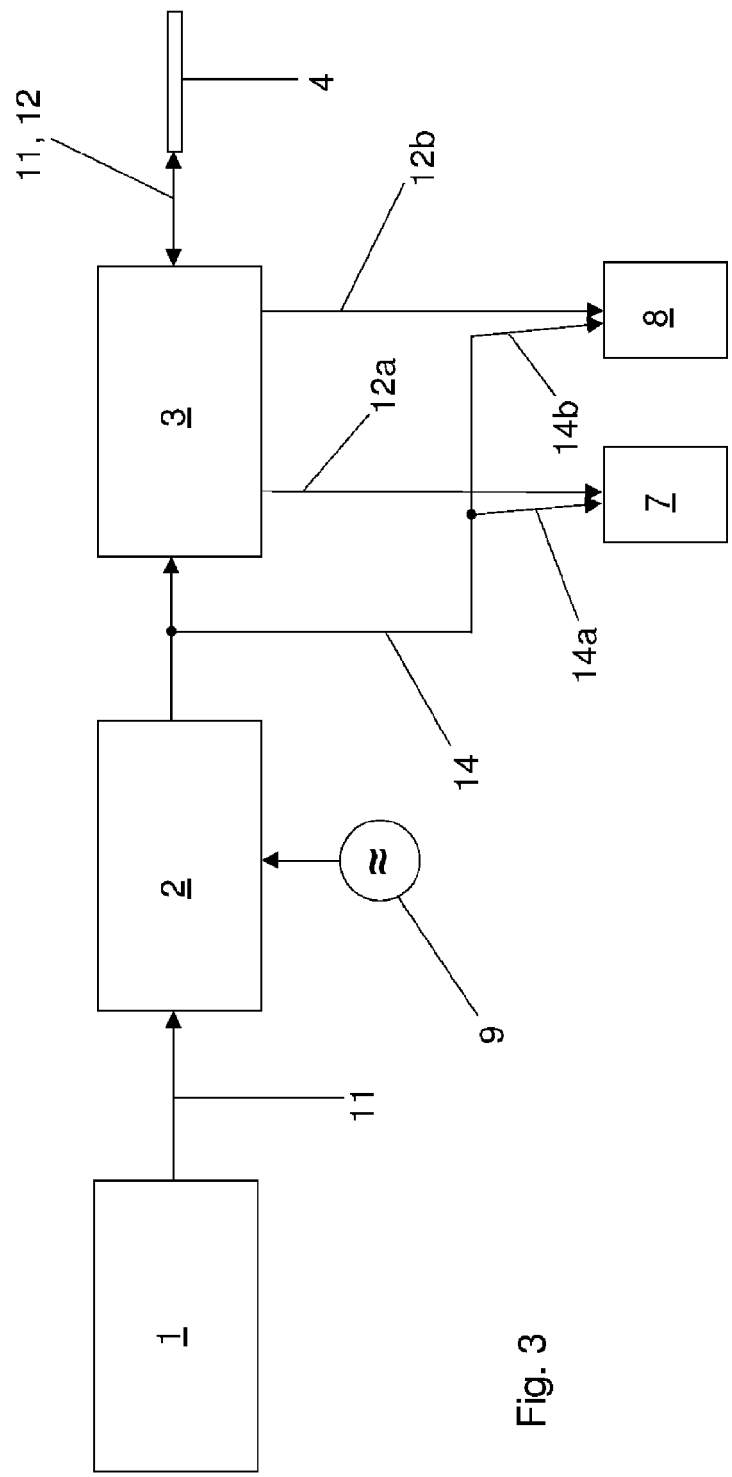
FIG. 3 shows a schematic illustration of a third embodiment of an apparatus according to the invention.

The second embodiment, depicted in FIG. 2, of an apparatus according to the invention differs from the first merely by virtue of the different form of demodulator means. Instead of two demodulator means 5, 6 in the form of a Mach-Zehnder modulator, for example, the second embodiment comprises means 13 for producing an additional light signal 14 which are actuated by actuating means 15 such that the additional light signal 14 is modulated, in particular frequency modulated. By way of example, the means 13 may be an additional laser light source. Alternatively, the means 13 could comprise a second Mach-Zehnder modulator, to which a portion of the light 11 from the laser light source 1 is routed and modulated.

The components 12a, 12b of the light which emerge from the filter and spectral splitter means 3 strike the sensor means 7, 8 directly in the second embodiment. At the same time, the additional, modulated light signal 14 is split into two portions 14a, 14b, which likewise strike the sensor means 7, 8.

In each of the sensor means 7, 8, the relevant component 12a, 12b backscattered from the optical fiber 4 can respectively be mixed with the portion 14a, 14b of the additional light signal 14. In this way too, optical demodulation of the backscattered components 12a, 12b can be achieved.

In a similar manner to the first embodiment, the second embodiment may also involve the frequencies prescribed by the actuating means 9, 15 being the same or different than one another.

The third embodiment is similar to the second embodiment, but with the third embodiment involving the means for producing the additional light signal 14 being able to be a beam splitter—not depicted. This undepicted beam splitter branches off a portion of the already modulated light 11 before it enters the filter and spectral splitter means 3. In this way, very simple means can be used to produce an additional modulated light signal 14. However, the modulation frequency in this case automatically corresponds to the modulation frequency of the backscattered components 12a, 12b, as a result of which there is homodyne demodulation or detection.

Alternatively, a portion of the as yet unmodulated light 11 from the laser light source 1 can be branched off and routed to a second modulator. In this way, it would also be possible to perform heterodyne demodulation or detection.

The invention claimed is:

1. An apparatus for spatially resolved temperature measurement, comprising:
    at least one optical fiber (4) for the spatially resolved temperature measurement,
    at least one laser light source (1), providing light which is coupled into the optical fiber (4), wherein the light (11) produced by the laser light source (1) includes components (12, 12a, 12b) which are backscattered in the optical fiber (4) and which are coupled out from the optical fiber (4) and detected,
    an optical modulator (2) which performs modulation of the light (11) which is to be coupled into the optical fiber (4),
    an optical demodulator which performs demodulation of the components (12, 12a, 12b) of the light (11) which are coupled out from the optical fiber (4),
        wherein the optical demodulator comprise a beam splitter for producing an additional light signal (14), the beam splitter branching off a portion of the light (11) modulated by the optical modulator (2) before it is coupled into the optical fiber (4), wherein the additional light signal (14) is being detected together with the components (12, 12a, 12b) of the light (11) which are coupled out from the optical fiber (4),
        wherein the optical fiber output is indicative of the spatially resolved temperature.

2. The apparatus as claimed in claim 1, wherein the demodulator comprise at least one sensor (7, 8) which detects the additional light signal (14) together with the components (12, 12a, 12b) of the light (11) which are coupled out from the optical fiber (4).

3. The apparatus as claimed in claim 2, wherein the at least one sensor (7, 8) comprise a photodiode.

4. The apparatus as claimed, in claim 1, wherein the optical modulator (2) comprise a is a Mach-Zehnder modulator.

5. The apparatus as claimed in claim 4, wherein the Mach-Zehnder modulator has two interferometer arms onto which the light (11) is split, wherein in one of the arms the light (11) is modulated by an electro-optical modulator.

6. The apparatus as claimed in one of claim 1, wherein the apparatus is an OFDR-DTS appliance or an OTDR-DTS appliance.

7. A method for spatially resolved temperature measurement using an apparatus for spatially resolved temperature measurement including; at least one optical fiber (4) for the spatially resolved temperature measurement; at least one laser light source (1), providing light (11) which is coupled into the optical fiber (4), wherein the light (11) produced by the laser light source (1) includes components (12, 12a, 12b) which are backscattered in the optical fiber (4) and which are coupled out from the optical fiber (4) and detected, an optical modulator (2) which allows modulation of the light (11) which is to be coupled into the optical fiber (4); an optical demodulator which allow demodulation of the components (12, 12a, 12b) of the light (11) which are coupled out from the optical fiber (4); wherein the optical demodulator comprises a beam splitter for producing an additional light signal (14), the beam splitter branches off a portion of the light (11) modulated by the optical modulator (2) before it is coupled into the optical fiber (4): wherein the additional light signal (14) is being, detected together with the components (12, 12a, 12b) of the light (11) which are coupled out from the optical fiber (4), the method comprising, the following steps:
    producing the light (11) using the laser light source (1);
    modulating the light (11) with the optical modulator;
    coupling the modulated light (11) into the optical fiber (4);
    coupling out from the Optical fiber (4) the components (12, 12a, 12b) of the couple (light (11) which are backscattered in the optical fiber (4);
    the coupled out components (12, 12a, 12b) of the light are demodulated using the optical demodulator;
    wherein a portion of the light (11) modulated by the optical modulator (2) is branched off as an additional light signal (14) before it is coupled into the optical fiber (4), the additional light signal (14) being detected together with the components (12, 12a, 12b) of the light (11) which are coupled out from the optical fiber (4);
    wherein the optical fiber output is indicative of the spatially resolved temperature.

8. The method as claimed in claim 7, wherein the modulation is effected by a Mach-Zehnder modulator.

9. The method as claimed in claim 7, wherein the method is an OFDR or OTDR method.

10. The method as claimed in claim 9, wherein the OFDR method involves the intensity of the light (11) being modulated with fixed or discrete frequencies.

11. The method as claimed in claim 9, wherein the OFDR method involves the intensity of the light (11) being modulated with a frequency which varies over time.

* * * * *

UNITED STATES PATENT AND TRADEMARK OFFICE
CERTIFICATE OF CORRECTION

PATENT NO. : 9,157,810 B2  
APPLICATION NO. : 13/499514  
DATED : October 13, 2015  
INVENTOR(S) : Wieland Hill Page 1 of 1

It is certified that error appears in the above-identified patent and that said Letters Patent is hereby corrected as shown below:

In the Claims:

Claim 7

Col. 6, line 21, change ":" to --,--.

Col. 6, line 22, delete the ",".

Col. 6, line 24, delete the ",".

Col. 6, line 28, change "Optical" to --optical--.

Col. 6, line 29, change "couple (light (11)" to --coupled light (11)--.

Signed and Sealed this
First Day of March, 2016

Michelle K. Lee
*Director of the United States Patent and Trademark Office*